March 1, 1927.  E. V. NUNLIST  1,619,152
FISHPOLE HOLDER
Filed March 6, 1922
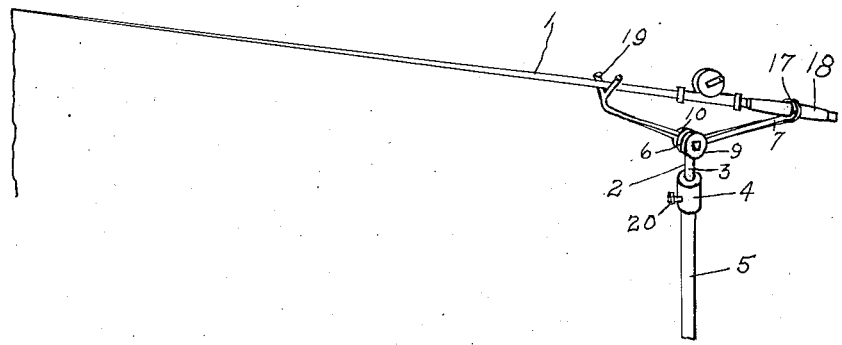
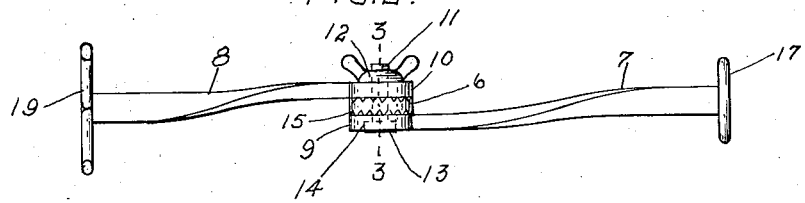
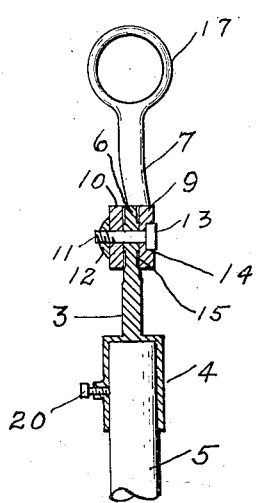
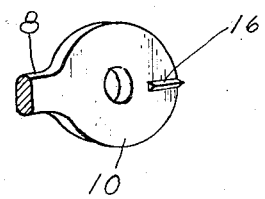
INVENTOR
EMIL V. NUNLIST,
BY
ATTORNEY Patented Mar. 1, 1927.

1,619,152

UNITED STATES PATENT OFFICE.

EMIL V. NUNLIST, OF INDIANAPOLIS, INDIANA.

FISHPOLE HOLDER.

Application filed March 6, 1922. Serial No. 541,420.

This invention relates to fish pole holders and is designed primarily for use in still fishing, and the prime object of the invention is to provide a holder for engagement with the handle end of the fishing rod, said holder having a socket for receiving a pole or anchoring rod.

A further feature of the invention is in so constructing the parts of the holder that the fishing pole may be held at any desired angle while the anchoring rod may be also extended at any desired angle from the supporting arms of the holder.

And a further feature of the invention is the provision of means for quickly locking the arms of the holder in fixed position.

Other objects and advantages will be hereinafter more fully set forth and pointed out in the accompanying specification.

In the accompanying drawings,

Figure 1 is a perspective view of the holder applied to use,

Figure 2 is an enlarged top plan view of the holder,

Figure 3 is a sectional view as seen on line 3—3 Figure 2, and

Figure 4 is a detail perspective view of the clamping end of one of the supporting arms of the holder.

Referring to the drawings, 1 indicates a fish pole which may be of the usual or any preferred type, and in order to support the pole either from the bank or a body of water, or support it at some point in the body of water, a holder 2 is provided, said holder comprising a stem 3 having a socket 4 at its lower end for the reception of an anchoring rod 5, and having a head 6 at its upper end. Co-operating with the head 6 are arms 7 and 8, said arms having heads 9 and 10 at their inner ends which register with the head 6, and these heads are locked together by means of a bolt 11, one end of which is threaded to receive a wing nut 12, while the opposite end is provided with a head 13 which preferably enters a recess 14 in the outer face of the head 9. The opposed faces of the head 6 are provided with notches 15 with which co-operate teeth 16 on the inner faces of the heads 9 and 10, so that when the arms 7 and 8 have been properly adjusted with respect to the remainder of the device, and the wing nut 12 is tightened on the bolt 10, the arms 7 and 8 will be locked in adjusted position and held in such position until such time as the wing nut is again loosened.

The outer end of the arm 7 is provided with a ring 17 through which the handle portion 18 of the pole 1 is extended, while the outer end of the arm 8 is provided with a fork 19 through which the rod 1 passes, and by arranging the ends of the arms in this manner the pole may be quickly mounted upon the holder, or removed therefrom, and by extending the ring and fork a distance apart the usual form of reel may be used in connection with the pole and so support it that the operation thereof will not be interfered with by the holder. Any suitable means may be provided for temporarily attaching the anchoring rod 5 within the socket 4, and in this instance a set screw 20 is threaded through one face of the socket, the inner end of the set screw binding against the inserted end of the anchoring rod.

In applying the device to use, the free end of the anchoring rod 5 is forced into the soil at the edge of a stream, or it may be forced into the bed of the stream a distance from the shore, and after the arms 7 and 8 have been properly adjusted to support the pole, the handle end of the pole is introduced through the ring portion of the arm 7 and the pole then rested in the fork 19, thereby properly supporting the pole for fishing purposes without requiring the undivided attention of the fisherman.

It will further be seen that after the fish has been empaled upon the hook, the pole may be quickly and easily removed from the holder for playing and landing the fish in the usual manner, consequently one fisherman may attend to a number of poles at the same time.

It will further be seen that when the holder is not in use, by removing the anchoring rod and loosening the wing nut, the parts of the holder may be folded together so as to occupy but a minimum amount of space.

Having thus fully described my said invention, what I claim as new and desire to secure by Letters Patent, is:

A fish pole holder comprising a stem having its lower extremity provided with an enlarged cylindrical socket adapted to fit over a support, said enlarged cylindrical socket having an enlargement at one side, a set screw threaded through said enlargement for clamping the socket on a support said stem having its upper end flattened and forming an enlarged head, said head being provided with serrations on each side, an arm having one end terminating in a fork, a second independent arm having one end terminating in a ring, said fork and ring being adapted to engage a fish pole, said arms being twisted and having flattened heads disposed in upright position at right angles to their opposite ends for engagement with the flattened head of the stem, a tooth on the inner side of the flattened heads for co-operation with serrations on the flattened head of the stem, a bolt extending through said flattened heads and having a wing nut for fastening the head and arms together in various positions of adjustment, substantially as set forth.

In witness whereof, I have hereunto set my hand at Indianapolis, Indiana, this 3rd day of March, A. D. nineteen hundred and twenty-two.

EMIL V. NUNLIST.